Patented Apr. 26, 1932

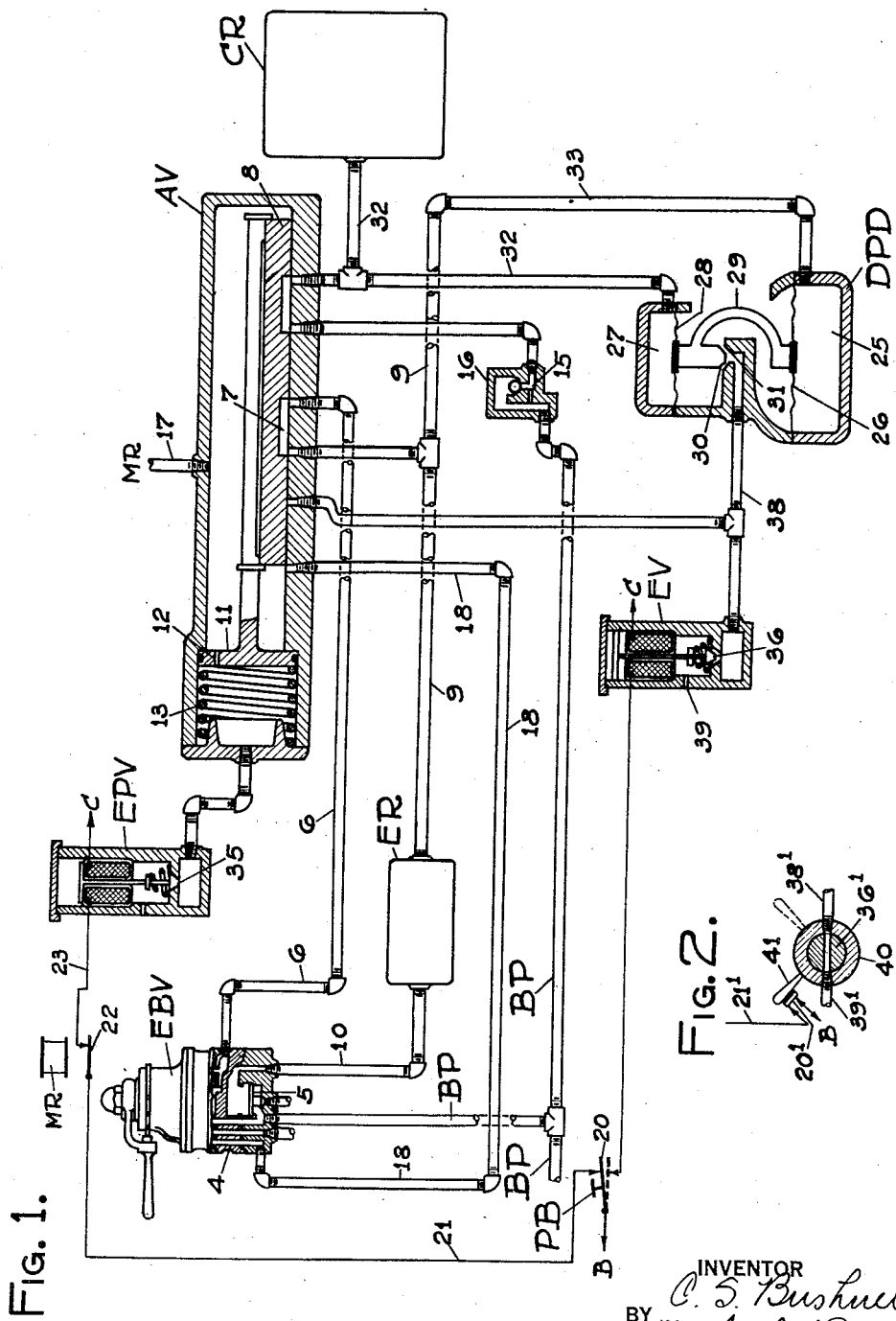

1,855,597

UNITED STATES PATENT OFFICE

CHARLES S. BUSHNELL, OF ROCHESTER, NEW YORK, ASSIGNOR TO GENERAL RAILWAY SIGNAL COMPANY, OF ROCHESTER, NEW YORK

BRAKE APPLYING APPARATUS

Application filed May 17, 1929. Serial No. 363,740.

This invention relates to automatic brake control apparatus of the normally charged brake pipe type, and more particularly to the means for limiting the reduction in brake pipe pressure to a predetermined extent, providing the engineer manifests his capacity to control his train by operating suitable manually operated means.

For reasons well understood by those skilled in the art of air-braking, it is desirable to vent the usual brake pipe to a predetermined extent only, because air is wasted, if the brake pipe is vented to a greater extent resulting in an unnecessary waste of energy and resulting in delay in releasing the brakes after an automatic brake application has taken place. Automatic brake applying apparatus, including limited reduction means, sometimes results in an inadequate brake application, possibly because the automatic brake application occurs simultaneously with the release of the brakes by the engineer having his engine brake valve in the release position. This latter condition may charge the equalizing reservoir to a pressure above that of the brake pipe, whereby if the equalizing reservoir pressure is reduced to a predetermined fractional part of its initial pressure, the brake pipe may be vented less than it should be because the brake pipe was charged to a lower pressure than the pressure existing in the equalizing reservoir at the time.

In accordance with the present invention it is proposed to employ a brake control apparatus in which upon an automatic brake application the brake pipe pressure is reduced to a predetermined extent below the pressure existing in a capacity reservoir normally connected to the brake pipe, but only in the event that the engineer has manifested his ability to control his train by depressing a suitable acknowledging device, so that the brake pipe is vented to a limited extent if the engineer depresses his acknowledging device, but is vented to zero pressure if the engineer fails to make the acknowledging act.

Other objects, purposes, and characteristic features of the invention will in part be obvious from the accompanying drawings and will in part be pointed out in the description hereinafter.

In describing the invention in detail reference will be made to the accompanying drawings in which:—

Fig. 1 shows one embodiment of an air brake system having the present invention applied thereto; and Fig. 2 shows a manually operable valve together with a protective contact, which is a modified construction that may be substituted for the electric valve and the control push button shown in Fig. 1 of the drawings.

In my prior application Ser. No. 302,237, I have described an automatic brake control apparatus in which an isert is inserted between the upper and lower part of the usual G6 or H6 Westinghouse engineer's brake valve, whereby the chamber of the engineer's brake valve may be isolated from the seat of the rotary valve of such engineer's valve if a suitable application valve is moved to its brake-applying position. The present invention is applied to automatic brake control apparatus such as shown in said prior application, and since this specific feature is not to be claimed in the present application reference may be had to said prior application for a more complete description of this apparatus.

Referring to Fig. 1 of the drawings the engineer's brake valve EBV is modified by the insertion of an insert 4 as disclosed in said prior application, so that the same equalizing discharge piston and valve 5 and the same equalizing reservoir ER may be used for making either a manual or an automatic brake application. It will be noted that normally the partition in the insert 4 is ineffective, because this partition is by-passed by the pipe 6, cavity 7 in the slide valve 8 of the application valve AV, pipe 9, equalizing reservoir ER and pipe 10.

The application valve AV includes a piston 11 having a leakage port 12, which piston 11 is normally held in its right hand position by a compression spring 13, thus holding the slide valve 8 in its extreme right hand position. The capacity reservoir CR is normally connected to the brake pipe BP through a restricted port 15, which is bypassed by a check valve 16, so that the capacity reservoir CR may be recharged only at restricted rate but can be discharged at a high rate. Main reservoir pressure is normally supplied to the top of the rotary valve of the engineer's brake valve from the main reservoir MR, pipe 17, chamber of the application valve AV, and pipe 18.

The application valve AV is held in its normal position so long as the electro-pneumatic valve EPV is energized, this valve EPV being normally energized by a circuit beginning at the terminal B of a suitable battery, normally closed contacts 20 of the push button PB, wire 21, front contact 22 of a suitable normally energized main relay MR controlled by suitable automatic train control mechanism, wire 23, winding of the device EPV, to a common return wire C connected to the other side of said battery.

There is also provided an electric valve EV which is normally de-energized and which may be energized if the engineer depresses the push button PB through a circuit readily traced in the drawings. It will be noted that upon depression of the push button PB to energize the electric valve the circuit for the electro-pneumatic valve EPV is broken at the normally closed protection contact 20. This contact 20 assures that the engineer will not tie the push button PB down permanently to avoid the requirement of making an acknowledging act. In other words, depression of the push button PB effects a brake application if the brakes were not already applied, and therefore the engineer is penalized by a brake application if he depresses the push button when the valve EPV is still energized. This is also a safety feature, because operation of the push button PB by the engineer upon passing a danger signal effects a brake application, so that should the main relay MR fail to drop the engineer would himself and unconsciously effect a brake application.

The brake control apparatus also includes a differential pressure responsive device DPD, which includes a large diaphragm chamber 25 of which one wall comprises the diaphragm 26, and a small diaphragm chamber 27 of which one wall consists of a diaphragm 28. The centers of these diaphragms 26 and 28 are connected together as by a yoke 29, which yoke 29 operates a valve 30 adapted to seat against the seat 31. The small chamber 27 is connected as by pipe 32 to the capacity reservoir CR, and the large chamber 25 is connected as by pipes 33 and 9 to the equalizing reservoir ER, from which it appears that if the equalizing reservoir pressure is reduced to a predetermined fraction of the pressure existing in the capacity reservoir CR, this fraction depending upon the ratio of the areas of diaphragms 28 and 26 is such that the valve 30—31 closes when the equalizing reservoir ER has had its pressure reduced below that of the capacity reservoir CR to an amount to give a full-service brake application. It is believed that the invention is best understood by briefly considering how an automatic brake application will cause the brake pipe to be vented to zero pressure if the engineer does not manifest his capacity to control his train but is vented only to a limited extent if the engineer is alert and depresses the push button PB.

*Operation.*—Let us assume that the main relay MR is de-energized by suitable train control apparatus (not shown), thereby causing the electro-pneumatic valve EPV to assume its de-energized position in which position the valve 35 is unseated and pressure is vented from the chamber of the application valve AV containing the spring 13. Since the leakage port 12 in the piston 11 is small compared with the exhaust afforded by the valve EPV, main reservoir pressure on the right side of piston 11 will force this piston toward the left and in turn shift the slide valve 8 to its left hand position. In this position of the slide valve 8, main reservoir pressure is cut off from the pipe 18, so that the engineer cannot recharge the brake pipe by moving his engineer's brake valve EBV to the release position. With the application valve AV moved to its brake applying position the capacity reservoir CR is isolated from the brake pipe BP, so that initial brake pipe pressure has been trapped in the capacity reservoir CR. Similarly, with the slide valve 8 moved to its brake applying position the partition in the insert 4 has been rendered active by shifting of the cavity 7, and this cavity 7 now connects the equalizing reservoir ER to atmosphere through the exhaust port 30—31. As soon as the equalizing reservoir pressure has dropped to a value such that the force of the diaphragm 28 predominates over the force of the diaphragm 26, the valve 30—31 is closed and fluid pressure can no longer escape from the equalizing reservoir ER through valve 30—31.

If, the engineer has not signified his vigilance, capacity and alertness by depressing the push button PB, the valve EV will remain de-energized and the equalizing reservoir ER will be vented to zero through the poppet valve 36 of the electric valve EV. Venting of the equalizing reservoir ER, through the medium of the equalizing discharge valve 5, of course, causes venting of the brake pipe BP to the same extent. It is thus seen that if the engineer does not depress push button PB that the brake pipe will be vented to zero.

If, on the other hand, the engineer depresses the push button PB as soon as he is aware of the fact that an automatic brake application is being imposed the electric valve EV is energized so as to close its valve 36, and the equalizing reservoir ER is only vented to a point where the differential pressure device DPD closes its valve 30—31. It should be noted that the acknowledging push button PB is protected against misuse by reason of the fact that its normally closed contact 20 is in series with the energizing circuit for the electro-pneumatic valve EPV, so that the engineer may only depress the push button PB to close valve 36 when the electro-pneumatic valve EPV has already been de-energized or he will suffer the consequences of an automatic brake application imposed by himself. The engineer will therefore not tie the push button PB down to obtain perpetual acknowledgment. If the push button PB is depressed immediately upon the initiation of an automatic brake application, the engineer is indemnified by having the brake pipe pressure reduced only to a limited extent instead of having it reduced to zero. This push button PB is preferably unbiased and will remain in either of its two positions.

*Modified construction.*—Instead of employing the electric valve EV controlled by the push button PB for controlling a valve, the manually operable valve 40 having a handle 41 may be used, in which case the valve 40 is protected against misuse by taking the circuit for the electro-pneumatic valve EPV through a contact $20^1$ controlled by the valve handle 41, and closed when the valve 41 is in its normal open position. In other words, in the embodiment of the modified construction shown in Fig. 2 the pipe $38^1$, valve $36^1$ and exhaust pipe $39^1$ are substituted respectively for the pipe 38 and ports 36 and 39 of Fig. 1, and the contact $20^1$ and wire $21^1$ are substituted for the front contact 20 and wire 21 of Fig. 1 of the drawings, it being understood that the operation of the handle 41 to the dotted position closes the valve $36^1$ in the same way as operation of push button PB (see Fig. 1) to its dotted position effects closing of the valve 36.

Having thus shown and described two embodiments of the present invention as applied to one particular form of brake control apparatus, it is desired to be understood that the embodiments selected have been selected for the purpose of facilitating disclosure of the invention and its operating characteristics, and have not been resorted to for the purpose of showing the scope of the invention of the particular construction preferably employed in practicing the same, and that various changes, modifications and additions, may be made to adapt the invention to the particular type of train control system encountered in practicing the invention, all without departing from the spirit or scope of the invention, or idea of means underlying the same, except as demanded by the scope of the following claims.

What I claim is:—

1. Automatic brake control apparatus comprising, an air brake system of the normally charged brake pipe type wherein venting of the brake pipe results in a brake application, an equalizing reservoir, an equalizing discharge piston valve, a normally energized electro-pneumatic valve which if de-energized effects venting of said equalizing reservoir and in turn venting of said brake pipe, means for limiting the venting of said brake pipe including a differential pressure device having a valve and constructed so that a predetermined ratio of pressure in two chambers of said device effects closure of said valve to stop such venting, a capacity reservoir normally connected to the brake pipe but isolated from said brake pipe when said electro-pneumatic valve is de-energized and connected to one of said chambers, means for connecting said equalizing reservoir to the other chamber of said differential pressure device, and a manually operable valve normally by-passing the valve of said differential pressure device.

2. Automatic brake control apparatus comprising, an air brake system of the normally charged brake pipe type wherein venting of the brake pipe results in a brake application, an equalizing reservoir, a normally energized electro-pneumatic valve which if de-energized effects venting of said brake pipe, including a differential pressure device having a valve and constructed so that a predetermined ratio of pressures in two chambers of said device effects closure of said valve to stop such venting, a capacity reservoir normally connected to the brake pipe but isolated from said brake pipe when said electro-pneumatic valve is de-energized and connected to one of said chambers, means for connecting said equalizing reservoir to the other chamber of said differential pressure device, and a manually controllable valve normally by-passing the valve of said differential pressure device.

3. Automatic brake control apparatus comprising, an air brake system of the normally charged brake pipe type wherein venting of the brake pipe results in a brake application, an equalizing reservoir, a normally energized electro-pneumatic valve which if de-energized effects venting of said equalizing reservoir, means for venting said brake pipe in accordance with venting of said equalizing reservoir, means for limiting the venting of said brake pipe including a differential pressure device having a valve and constructed so that a predetermined ratio of pressures in two chambers of said device effects closure of said valve to stop such venting, a capacity reservoir normally connected to the brake pipe but isolated from said brake pipe when said electro-pneumatic valve is de-energized and connected to one of said chambers, means for connecting said equalizing reservoir to the other chamber of said differential pressure device, a manually controllable valve normally by-passing the valve of said differential pressure device, and means for penalizing the engineer if he closes said manually controllable valve before an automatic brake application has been imposed.

4. Automatic brake control apparatus comprising, an air brake system of the normally charged brake pipe type wherein venting of the brake pipe results in a brake application, an equalizing reservoir, a normally energized electro-pneumatic valve which if de-energized effects venting of said equalizing reservoir, means for venting the brake pipe in accordance with the degree of venting of said equalizing reservoir, means for limiting the venting of said brake pipe including a differential pressure device having a valve and constructed so that a predetermined ratio of pressures in two chambers of said device effects closure of said valve to stop such venting, a capacity reservoir normally connected to the brake pipe but isolated from said brake pipe when said electro-pneumatic valve is de-energized and connected to one of said chambers, means for connecting said equalizing reservoir to the other chamber of said differential pressure device, a circuit for said electro-pneumatic valve closed under favorable traffic conditions ahead, a manually controllable valve normally by-passing the valve of said differential pressure device, and means associated with said manually controllable valve for opening said circuit when said manually controllable valve is closed.

5. Automatic brake control apparatus comprising, an air brake system of the normally charged brake pipe type wherein venting of the brake pipe results in a brake application, an equalizing reservoir, a normally energized electro-pneumatic valve which if de-energized effects venting of said equalizing reservoir, means for venting said brake pipe in response to venting of said equalizing reservoir, means for limiting the venting of said brake pipe including a differential diaphragm device having a large and a small diaphragm, a vent limiting valve connected in series with the valve of said electro-pneumatic valve and closed when the force exerted by the small diaphragm exceeds the force exerted by the large diaphragm, means for exerting a pressure against the small diaphragm equal to brake pipe pressure before a brake application was initiated, means for exerting equalizing reservoir pressure against the large diaphragm, and a manually controllable valve normally by-passing said vent limiting valve.

6. Automatic brake control apparatus for trains comprising, an air brake system of the normally charged brake pipe type wherein venting of the brake pipe results in a brake application, an equalizing reservoir, a normally energized electro-pneumatic valve which if de-energized effects venting of said equalizing reservoir, means for venting the brake pipe in accordance with the degree of venting of said equalizing reservoir, means for limiting the venting of said equalizing reservoir including a differential diaphragm device having a large and a small diaphragm, a vent limiting valve closed if the force exerted by the small diaphragm exceeds the force exerted by the large diaphragm, means for exerting a pressure against the small diaphragm equal to brake pipe pressure before a brake application was initiated, means for exerting equalizing reservoir pressure against the large diaphragm, a manually controllable valve normally by-passing said vent limiting valve, and means for preventing progress of the train if the engineer keeps said manually controllable valve closed permanently.

7. Automatic brake control apparatus comprising, an air brake system of the normally charged brake pipe type wherein venting of the brake pipe results in a brake application, an equalizing reservoir, a normally energized electro-pneumatic valve which if de-energized effects venting of said equalizing reservoir, means for venting said brake pipe to a pressure corresponding to the pressure existing in said equalizing reservoir, means for limiting the venting of said equalizing reservoir including a differential diaphragm device having a large and a small diaphragm and a vent limiting valve closed if the force exerted by the small diaphragm exceeds the force exerted by the large diaphragm, means for exerting a pressure against the small diaphragm equal to brake pipe pressure existing before a brake application was initiated, means for exerting equalizing reservoir pressure against the large diaphragm, and manually controllable means for rendering said vent limiting valve effective upon closing to limit the extent of venting of said equalizing reservoir.

8. Automatic brake control apparatus comprising, an air brake system of the normally charged brake pipe type wherein venting of the brake pipe results in a brake application to prevent progress of the train, an equalizing reservoir, a normally energized electro-pneumatic valve which if de-energized effects venting of said equalizing reservoir, means for venting the brake pipe in accordance with the venting of said equalizing reservoir, means for limiting the venting of said equalizing reservoir including a differential diaphragm device having a large and a small diaphragm and a vent limiting valve closed if the force exerted by the small diaphragm exceeds the force exerted by the large diaphragm, means for exerting a pressure against the small diaphragm equal to brake pipe pressure before a brake application was initiated, means for exerting equalizing reservoir pressure against the large diaphragm, manually controllable means for rendering said vent limiting valve effective upon closing to limit the degree of venting of said equalizing reservoir, and means for preventing progress of the train if said manually controllable means is rendered effective permanently.

9. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition, and differential pressure means for venting said equalizing reservoir to a predetermined extent and closing said by-pass.

10. Automatic brake applying apparatus for controlling by train control apparatus the brakes of an air brake system of the normally charged brake pipe type and including a sectionalized engineer's brake valve including an associated equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; means for simultaneously closing said by-pass and venting said equalizing reservoir, and a differential pressure valve for limiting said venting of said equalizing reservoir to a predetermined extent.

11. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition, and means for simultaneously venting said equalizing reservoir to a predetermined fractional pressure value of its original pressure and closing said by-pass.

12. Automatic brake applying apparatus for controlling by train control apparatus the brakes of an air brake system of the normally charged brake pipe type and including a sectionalized engineer's brake valve including an associated equalizing discharge piston valve having a chamber above the same, an equalizing reservoir and a source of fluid pressure for feeding said brake valve; of an insert inserted between said sections of said engineer's brake valve to constitute a partition in said chamber, a by-pass for normally connecting opposite sides of said partition; means for simultaneously closing said by-pass and venting said equalizing reservoir to a predetermined fractional pressure value of its original pressure.

13. Automatic brake applying apparatus for controlling by train control apparatus the brakes of an air brake system of the normally charged brake pipe type and including a sectionalized engineer's brake valve including the associated equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; and means for simultaneously closing said by-pass and venting said equalizing reservoir to a predetermined fractional value of its original pressure.

14. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; and of an application valve for blanking said equalizing reservoir from the valve seat of said engineer's brake valve, and venting said equalizing reservoir to a predetermined fractional value of its original pressure upon operation of said application valve.

In testimony whereof I affix my signature.

CHARLES S. BUSHNELL.